United States Patent
Beck

(10) Patent No.: US 10,544,571 B2
(45) Date of Patent: Jan. 28, 2020

(54) ELECTRONIC FAUCET WITH SPATIAL ORIENTATION CONTROL SYSTEM

(71) Applicant: Spectrum Brands, Inc., Middleton, WI (US)

(72) Inventor: Chasen Beck, Costa Mesa, CA (US)

(73) Assignee: Spectrum Brands, Inc., Middleton, WI (US)

( * ) Notice: Subject to any disclaimer, the term of this patent is extended or adjusted under 35 U.S.C. 154(b) by 186 days.

(21) Appl. No.: 15/451,608

(22) Filed: Mar. 7, 2017

(65) Prior Publication Data

US 2017/0275860 A1 Sep. 28, 2017

Related U.S. Application Data

(60) Provisional application No. 62/313,385, filed on Mar. 25, 2016.

(51) Int. Cl.
*E03B 1/00* (2006.01)
*E03C 1/05* (2006.01)
*E03C 1/04* (2006.01)
*F16K 31/02* (2006.01)

(52) U.S. Cl.
CPC ............ *E03C 1/055* (2013.01); *E03C 1/0412* (2013.01); *F16K 31/02* (2013.01)

(58) Field of Classification Search
CPC ...... E03C 1/0412; E03C 1/055; F16K 19/006; F16K 31/605
See application file for complete search history.

(56) References Cited

U.S. PATENT DOCUMENTS

| | | |
|---|---|---|
| 3,151,340 A | 10/1964 | Minoru |
| 3,613,124 A | 10/1971 | Ichimori et al. |
| 4,716,605 A | 1/1988 | Shepherd et al. |
| 5,586,746 A | 12/1996 | Humpert et al. |
| 6,003,170 A | 12/1999 | Humpert et al. |
| 6,192,530 B1 | 2/2001 | Dai |
| 6,321,785 B1 | 11/2001 | Bergmann |
| 6,363,549 B2 | 4/2002 | Humpert et al. |
| 6,408,881 B2 | 6/2002 | Lorenzelli et al. |
| 6,619,320 B2 | 9/2003 | Parsons |
| 6,769,443 B2 | 8/2004 | Bush |
| 6,962,168 B2 | 11/2005 | McDaniel et al. |

(Continued)

OTHER PUBLICATIONS

PCT/US2017/023769; Electronic Faucet With Spatial Orientation Control System; International Search Report; dated Jun. 15, 2017.

*Primary Examiner* — Reinaldo Sanchez-Medina
(74) *Attorney, Agent, or Firm* — Merchant & Gould P.C.

(57) ABSTRACT

A faucet is provided that electronically controls the flow volume and temperature of water being dispensed. The faucet illustratively includes a faucet body and a faucet handle. The faucet illustratively includes an inertial motion unit sensor mounted in the faucet handle to sense spatial orientation of the faucet handle. The faucet illustratively includes an electronic flow control system to adjust flow volume and temperature of water being dispensed. The faucet illustratively includes a controller configured to receive signals from the inertial motion unit sensor and control the electronic flow control system to adjust flow volume and temperature of water being dispensed based upon the position of the faucet handle.

22 Claims, 9 Drawing Sheets

(56) References Cited

U.S. PATENT DOCUMENTS

| | | |
|---|---|---|
| 6,964,405 B2 | 11/2005 | Marcichow et al. |
| 6,968,860 B1 | 11/2005 | Haenlein et al. |
| 7,069,941 B2 | 7/2006 | Parsons et al. |
| 7,150,293 B2 | 12/2006 | Jonte |
| 7,537,023 B2 | 5/2009 | Marty et al. |
| 7,624,757 B2 | 12/2009 | Schmitt |
| 7,690,395 B2 | 4/2010 | Jonte et al. |
| 7,766,026 B2 | 8/2010 | Boey |
| 7,806,141 B2 | 10/2010 | Marty et al. |
| 7,997,301 B2 | 8/2011 | Marty et al. |
| 8,089,473 B2 | 1/2012 | Koottungal |
| 8,104,113 B2 | 1/2012 | Rodenbeck et al. |
| 8,118,240 B2 | 2/2012 | Rodenbeck et al. |
| 8,132,778 B2 | 3/2012 | Connors et al. |
| 8,355,822 B2 | 1/2013 | Jonte et al. |
| 8,365,767 B2 | 2/2013 | Davidson et al. |
| 8,376,313 B2 | 2/2013 | Burke et al. |
| 8,407,827 B1 | 4/2013 | Friedman et al. |
| 8,408,517 B2 | 4/2013 | Jonte et al. |
| 8,418,993 B2 | 4/2013 | Chen |
| 8,424,569 B2 | 4/2013 | Marty et al. |
| 8,516,628 B2 | 8/2013 | Conroy |
| 8,528,579 B2 | 9/2013 | Jonte et al. |
| 8,561,626 B2 | 10/2013 | Sawaski et al. |
| 8,613,419 B2 | 12/2013 | Rodenbeck et al. |
| 8,776,817 B2 | 7/2014 | Sawaski et al. |
| 8,820,705 B2 | 9/2014 | Davidson et al. |
| 8,844,564 B2 | 9/2014 | Jonte et al. |
| 8,922,369 B2 | 12/2014 | Sawaski |
| 8,939,429 B2 | 1/2015 | Sawaski et al. |
| 8,944,105 B2 | 2/2015 | Rodenbeck et al. |
| 8,973,612 B2 | 3/2015 | Sawaski et al. |
| 9,074,698 B2 | 7/2015 | Esche et al. |
| 9,175,458 B2 | 11/2015 | Meehan et al. |
| 9,187,884 B2 | 11/2015 | Belz et al. |
| 9,212,473 B2 | 12/2015 | Baker et al. |
| 9,228,329 B2 | 1/2016 | Rodenbeck et al. |
| 9,243,391 B2 | 1/2016 | Jonte et al. |
| 9,243,392 B2 | 1/2016 | Marty et al. |
| 9,254,499 B2 | 2/2016 | Klicpera |
| 9,271,613 B2 | 3/2016 | Rosko et al. |
| 9,285,807 B2 | 3/2016 | Rodenbeck et al. |
| 2007/0069169 A1 | 3/2007 | Lin |
| 2007/0246550 A1 | 10/2007 | Rodenbeck et al. |
| 2008/0071424 A1 | 3/2008 | St Jean et al. |
| 2008/0174550 A1 | 7/2008 | Laurila et al. |
| 2009/0293192 A1 | 12/2009 | Pons |
| 2009/0320949 A1 | 12/2009 | Liao |
| 2010/0206956 A1* | 8/2010 | Gautschi ............ E03C 1/055 236/12.12 |
| 2012/0266983 A1 | 10/2012 | Tsai et al. |
| 2013/0048090 A1 | 2/2013 | Yang |
| 2013/0182411 A1 | 7/2013 | Cuppen et al. |
| 2013/0291978 A1 | 11/2013 | Baker et al. |
| 2013/0340162 A1 | 12/2013 | Peel |
| 2014/0261780 A1 | 9/2014 | Thomas et al. |
| 2014/0338118 A1 | 11/2014 | Davidson et al. |
| 2015/0292187 A1 | 10/2015 | Tseng et al. |
| 2015/0308587 A1 | 10/2015 | Esche et al. |
| 2016/0032571 A1 | 2/2016 | Jepson et al. |

* cited by examiner

ELECTRONIC FAUCET WITH SPATIAL ORIENTATION CONTROL SYSTEM

RELATED APPLICATIONS

This application claims the benefit of U.S. Provisional Application No. 62/313,385 filed Mar. 25, 2016, which is hereby incorporated by reference in its entirety.

TECHNICAL FIELD

The present disclosure relates generally to faucets. In particular, the present disclosure relates to a faucet that is electronically controlled based on the spatial orientation of an input device.

BACKGROUND

Faucets typically comprise mechanical parts to control the temperature and flow of water. In many situations, a mechanical valve controls the hot and cold water inlets through one or more faucet handles. Typically, a user manipulates the mechanical valve to adjust hot/cold mix and water flow by maneuvering faucet handle(s). Due to the mechanical connection between the handle and valve, the faucet body typically must be sized to accommodate these mechanical components. The bulk of these components presents challenges in faucet designs.

With kitchen faucets, for example, attempts have been made to slim down the faucet body to create a more aesthetically pleasing design, but even these slim designs are dictated to a great extent by the need to include the mechanical valve in the faucet body, which is necessary to manipulate the temperature and flow of water. As a result, many components of kitchen faucets, such as the mechanical valve, are located above the kitchen countertop. This can make kitchen faucets bulky to some extent to allow room for the mechanical components.

SUMMARY

According to one aspect, the present disclosure provides a faucet that electrically controls the temperature and flow of water dispensed. The faucet illustratively includes a faucet body and a faucet handle. In illustrative embodiments, the faucet includes an inertial motion unit sensor that is mounted in the faucet handle to sense spatial orientation of the faucet handle. For example, in some embodiments, the faucet handle may include a sensor that detects where the faucet handle is located in relation to an initial position. This allows the faucet to detect the position of the faucet handle after maneuvering the faucet handle similar to how a user would maneuver a mechanical faucet handle.

In illustrative embodiments, the faucet includes an electronic flow control system that adjusts flow volume and temperature of water being dispensed. In an illustrative embodiment, the faucet includes a controller configured to receive the signals from the inertial motion unit sensor and control the electronic flow control system to adjust flow volume and temperature of water being dispensed based upon the position of the faucet handle.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which.

DETAILED DESCRIPTION

Figure 1:
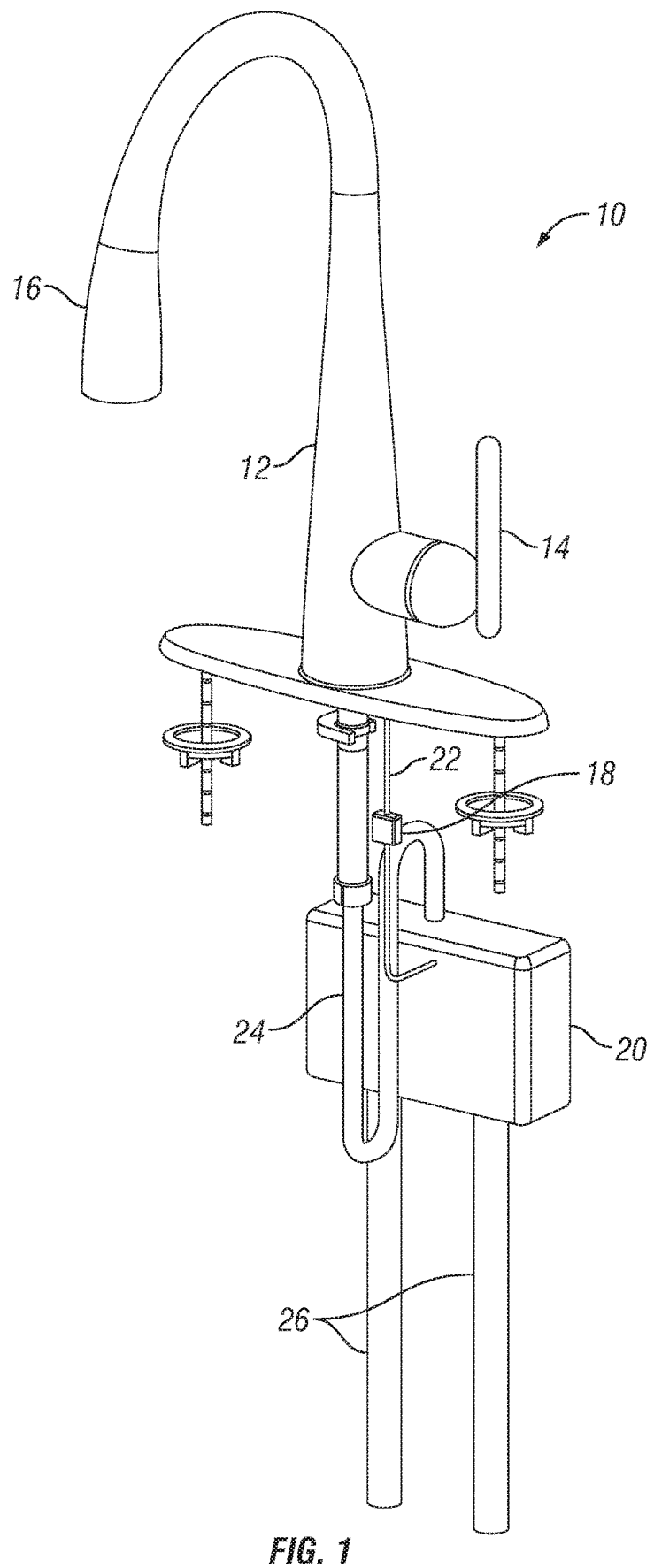
FIG. 1 is a perspective view of an example kitchen faucet according to an embodiment of the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 shows an example faucet 10 according to an embodiment of this disclosure. Although this disclosure will be discussed with regard to a kitchen faucet for purposes of example, the control system described herein could be implemented in any type of faucet, including bathroom faucets, whether the faucet has a single handle or two handles, bath tub spout controls, shower head controls, and any water delivery valves. In this regard, the term "faucet" is broadly intended to mean any of these water delivery devices. Although the faucet 10 is shown as a pull-down kitchen faucet for purposes of example, this disclosure encompasses other types of faucets, including but not limited to pull-out faucets. In the example shown, the faucet 10 includes a faucet body 12, a faucet handle 14, and a spray head 16 that can be detached or undocked from the faucet body 12. The faucet body 12 can be shaped differently to provide a different connection with the faucet handle 14 or spray head 16. For example, in another embodiment the faucet body 12 could be flush with the faucet handle 14 to provide a more streamlined appearance that reduces the space required by the faucet 10. In another embodiment, the faucet handle 14 does not need to be connected to directly to the faucet body 12, but could be remote from the faucet body 12.

As shown, the faucet 10 can be manually controlled (e.g., the temperature, water flow, and on/off) using the handle 14. In some cases, the faucet 10 could be manually adjusted electronically, such as using a hands-free sensor, touch activation, buttons or other interface. As discussed more below, the handle 14 can detect its spatial orientation and send signals to a controller 18 to control water flow using a flow control box 20 through signal wires 22.

In the embodiment shown, the flow control box 20 is connected to a pull down hose 24 to provide fluid communication from water supply inlet hoses 26 to spray head 16. As is typical, the water supply inlet hoses 26 can supply cold and hot water to be released from the spray head 16.

Figure 2:
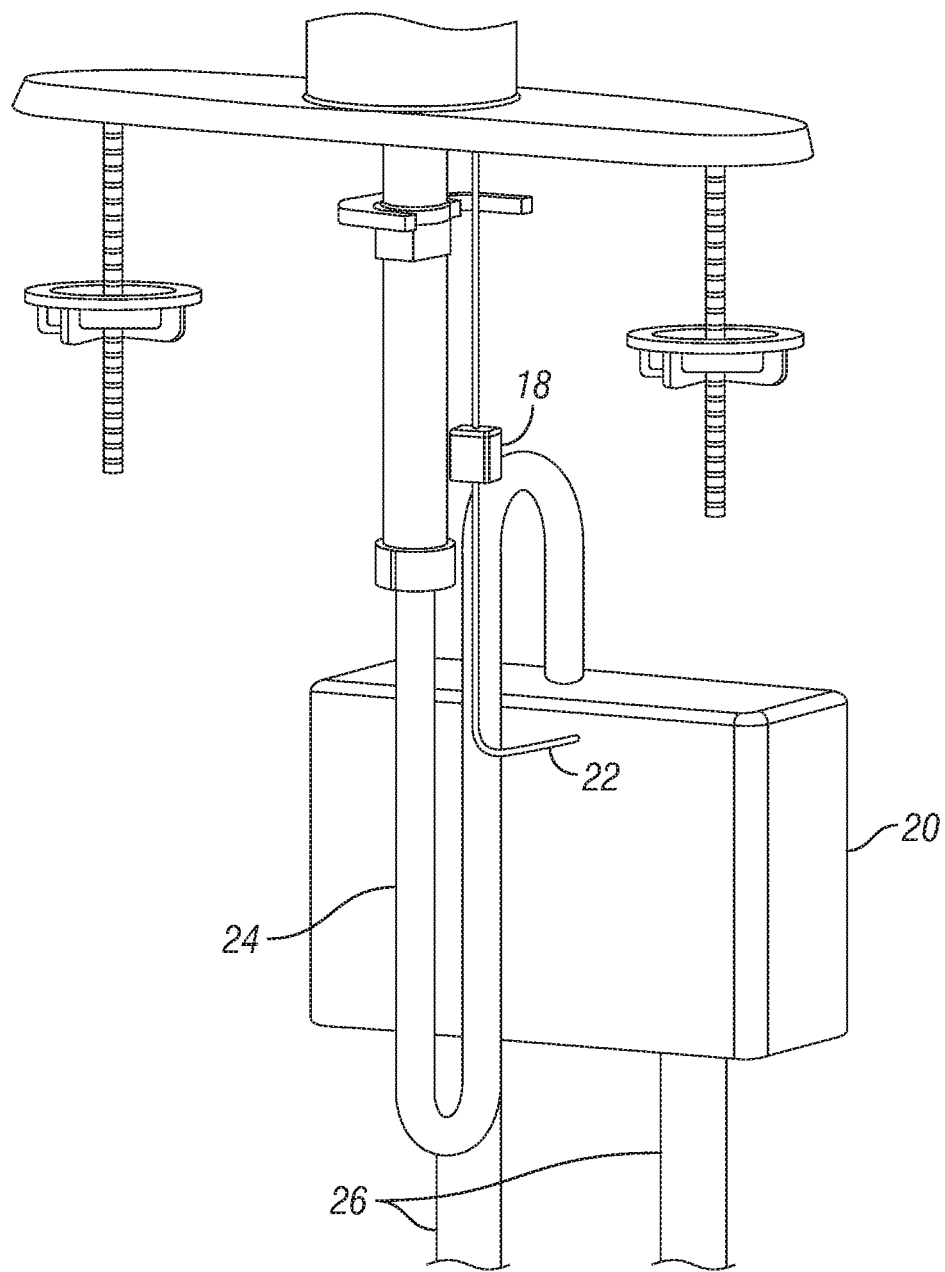
FIG. 2 is a detailed perspective view of the example kitchen faucet shown in FIG. 1 below a countertop.

Referring to FIG. 2, a closer look to the components of the faucet 10 under the counter top (not shown) is provided. As mentioned above, in one embodiment shown the controller 18 is connected to the flow control box 20 through signal wires 22 to analyze the signals sent from faucet handle 14 to control the flow of water from the water supply inlet hoses 26. The flow control box 20 can mix the water from water supply inlet hoses 26 to provide a water flow of a user-selected temperature to be released from the spray head 16. The flow control box 20 as shown is located under the counter top of the faucet 10. The flow control box 20 can be located elsewhere as appropriate to receive signals from controller 18 through signal wires 22 and provide water to be released from spray head 16 through pull down hose 24. The flow control box 20 can be located in a different position to provide more space underneath the counter top of faucet 10 depending on the circumstances.

In the example shown, the controller 18 is located outside of the flow control box 20. In another embodiment, the controller 18 can also be located inside of the flow control box 20. In another embodiment, the controller 18 can be located above the counter top of the faucet 10. The controller 18 could also be located inside the faucet handle 14.

The connection between the faucet handle 14, controller 18, and flow control box 20 is shown as a wired connection through signal wires 22. In another embodiment, the communication between the faucet handle 14, controller 18, and flow control box 20 can be done wirelessly.

Figure 3:
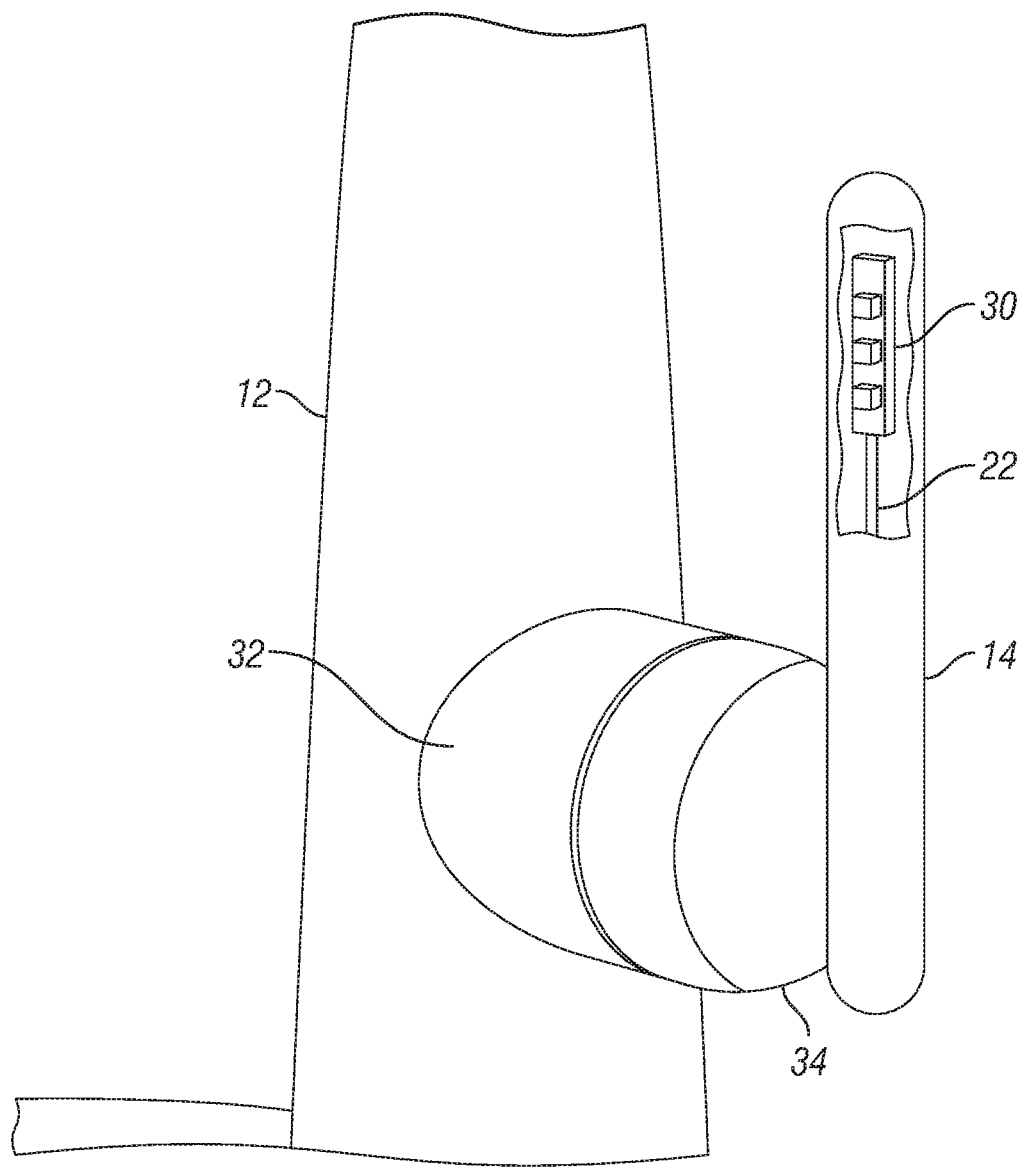
FIG. 3 is a detailed perspective view of a faucet handle of the example kitchen faucet of FIG. 1 with a breakaway to reveal the internal of the faucet handle according to an embodiment of the disclosure.

Referring to FIG. 3, a closer look at the faucet handle 14 is provided. There is a cut away to reveal the components inside of the faucet handle 14. In the example shown, the faucet handle 14 includes a sensor printed circuit board assembly (PCBA) 30 connected to the signal wire 22. As shown, the faucet handle 14 is connected to the faucet body 12 through a stationary faucet handle mount 32 in conjunction with a movable faucet handle mount 34. The stationary faucet handle mount 32 is connected to the faucet body 12. The stationary faucet handle mount 32 can be a part of the faucet body 12. The movable faucet handle mount 34 is movably connected to the stationary faucet handle mount 32. The movable faucet handle mount 34 is also connected to the faucet handle 14. The movable faucet handle mount 34 can be a part of the faucet handle 14. The connection between the stationary faucet handle mount 32 and the movable faucet handle mount 34 allows the faucet handle 14 to move at least rotationally along two axes of rotation. In one embodiment, one axis of rotation can represent the water flow being released from the spray head 16, and the other axis of rotation can represent the temperature of water being released from the spray head 16. Although the stationary faucet handle mount 32 and the movable faucet handle mount 34 extend from the faucet body 12 in the example shown, these components could be integral with the faucet body 12 to provide more flexibility for shape and size of the faucet body 12.

In one embodiment, the faucet handle 14 can be movably connected to the faucet body 12 without the stationary faucet handle mount 32 and the moveable faucet handle mount 34. The faucet handle 14 can also be movably connected to the spray head 16. As discussed above, the faucet handle 14 can be separate from the faucet body 12 altogether and be movably connected to a surface for movement along two axes of rotation.

The sensor PCBA 30 is configured to detect the spatial orientation of the faucet handle 14. In one embodiment, the sensor PCBA 30 is an inertial motion unit (IMU) sensor 30. The sensor PCBA 30 can send signals through signal wires 22 to controller 18 to interpret the signals. After the controller 18 determines a spatial orientation of the faucet handle 14 through the signals provided from sensor PCBA 30, the controller 18 can send signals to the flow control box 20 and control the water temperature and the water flow to be released from the spray head 16.

Figure 4:
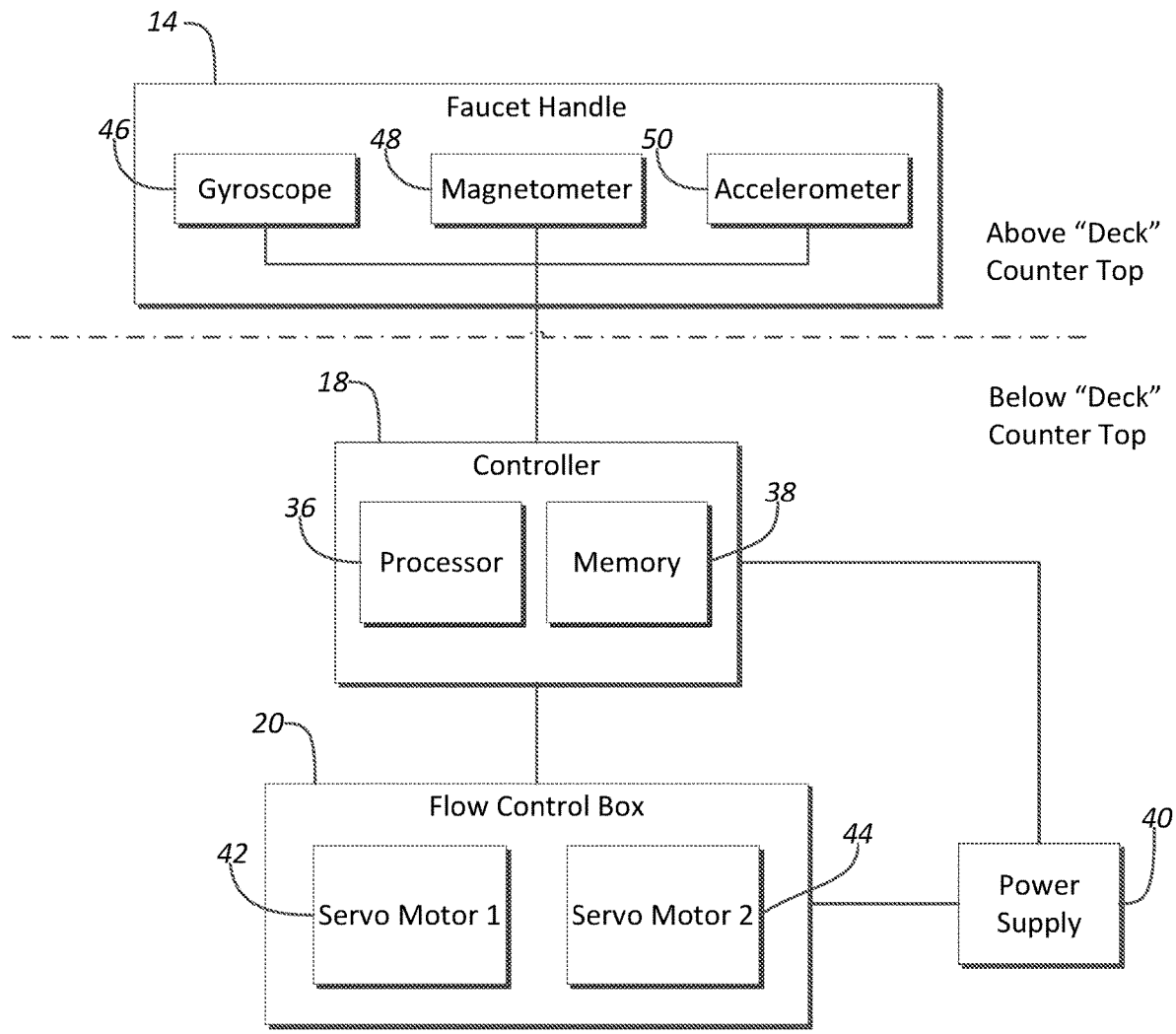
FIG. 4 is a simplified block diagram of an example control system for controlling dispensing of water from a kitchen faucet according to an embodiment of the disclosure.

Referring to FIG. 4, there is shown an example electronic control system for controlling dispensing of water from the faucet 10. In the example shown, the control system includes the controller 18 including a processor 36 to process the signals received from the faucet handle 14 to send a signal to the flow control box 20 and a memory 38 to store instructions to be executed by the processor 36. The control system also includes a power supply 40 that is connected to the controller 18 and the flow control box 20. The control system also includes the flow control box 20 including a servo motor 1 42 and a servo motor 2 44 to control the water received from water supply inlet hoses 26 (not shown) to output water of a determined flow rate and a determined temperature based upon the spatial orientation of the faucet handle 14. Servo motor 1 42 may be a servo motor for the control of cold water into the system. Servo motor 2 44 may be a servo motor for the control of hot water into the system. In the embodiment shown, the control system also includes the faucet handle 14 that receives inputs from at least one of a gyroscope 46, magnetometer 48, and accelerometer 50 of the sensor PCBA 30 (FIG. 3).

In one embodiment, the faucet handle 14 is located above the countertop and the controller 18, flow control box 20, and power supply 40 are located below the countertop. The components of the control system may be arranged above and below the counter top as appropriate. The power supply 40 provides power to the faucet handle 14 through the controller 18. In another embodiment, the power supply 40 may be connected directly to the faucet handle 14. The power supply 40 can be power supplied from an outlet and converted as necessary for use by the controller 18, flow control box 20, and faucet handle 14. The flow control box 20 may have a separate power supply 40 than the controller 18. The power supply 40 may be any power source to supply electrical power for the function of the faucet handle 14, controller 18, and the flow control box 20.

In one embodiment, the faucet handle 14 detects its spatial orientation through the use of at least one of the gyroscope 46, the magnetometer 48, and accelerometer 50. In another embodiment, the faucet handle 14 may use other sensors to detect its spatial orientation. The faucet handle 14 can send the signals received from the sensors 46, 48, 50 to the controller 18 to use an algorithm in order to determine the temperature of water and the flow rate of the water to be released from the spray head 16. In another embodiment, the controller 18 may use a look-up table to determine the temperature of water and the flow rate of the water to be released from the spray head 16. After determining the temperature and flow rate of the water, the controller 18 can send a signal to flow control box 20 to control the servo motor 1 42 and servo motor 2 44 to adjust the temperature and flow rate of the water being dispensed from the spray head 16. The flow control box 20 receives hot and cold water from the water supply inlet hoses 26 to output the water of a desired temperature and flow rate through the pull down hose 24 to the spray head 16.

In another embodiment, flow control box 20 may use more than two servo motors in order to control the temperature and flow rate of the water. The flow control box 20 may also use a series of solenoids, needle valve, stepper motor, etc. in order to control the temperature and flow rate of the water depending on the circumstances.

Figure 5:
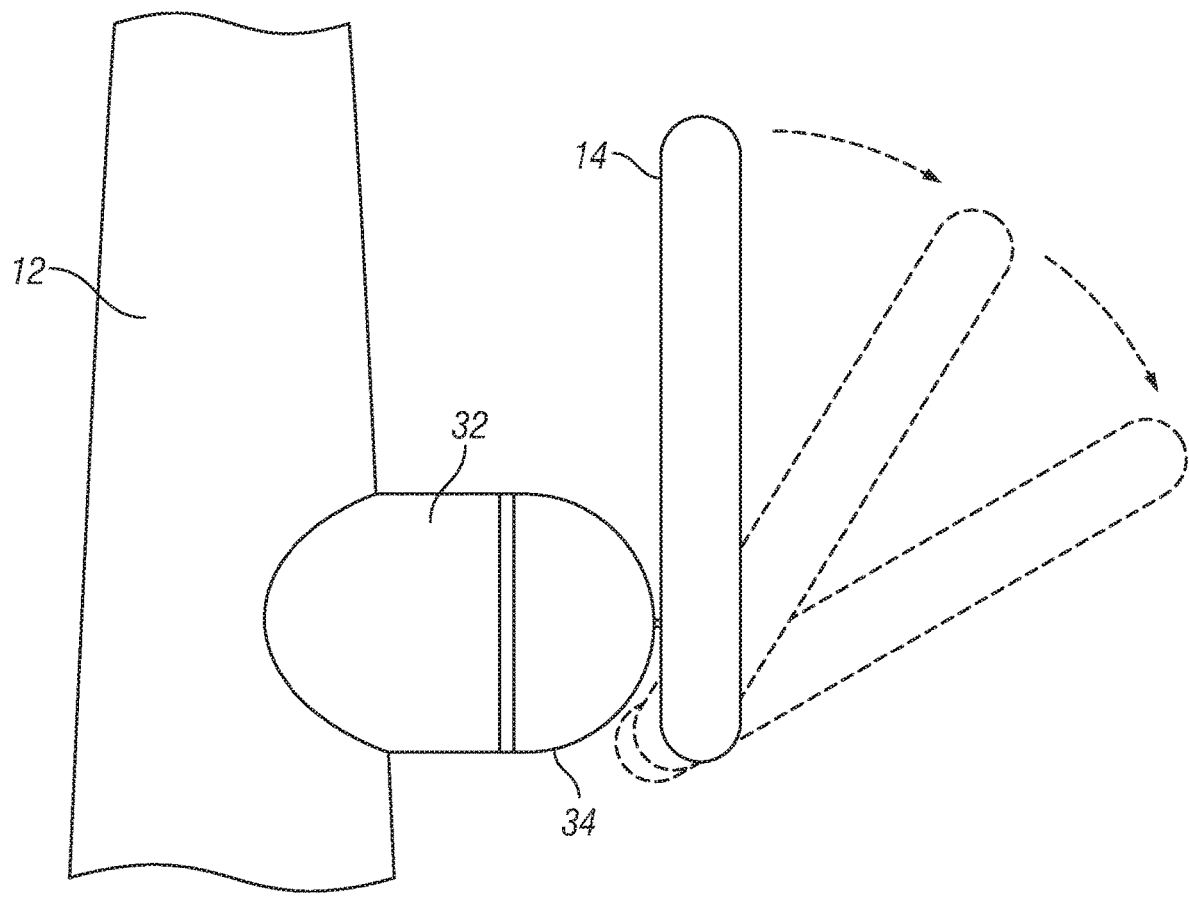
FIG. 5 is a front view of the faucet handle showing the degrees of rotation that the faucet handle can travel along one axis of the faucet handle according to an embodiment of the disclosure.

Referring to FIG. 5, there is shown progressive movement of the faucet handle 14 from an initial position where no water is being released to a fully extended position where the flow rate of water is at a maximum. In the example shown, the faucet body 12 is connected to the stationary faucet handle mount 32. The movable faucet handle mount 34 is movably connected to the stationary faucet handle mount 32. The faucet handle 14 is connected to the movable faucet handle mount 34 so a user can maneuver the faucet handle 14 along one axis as shown in relation to the faucet body 12.

In the shown embodiment, there are three different positions as the faucet handle 14 starts from an initial position rotating all the way to the fully extended position in phantom. In another embodiment, there may be a plurality of positions that the faucet handle 14 can achieve between an initial position to a fully extended position. In one embodiment, as the faucet handle 14 is rotated in the way shown in FIG. 5, the faucet handle 14 sends signals to the controller 18 to control the flow control box 20 to release more water of a temperature determined as discussed below. In one embodiment, the faucet 10 does not release any water when the faucet handle 14 is in the initial position. The faucet 10 begins to release water of variable amounts when the faucet handle 14 is rotated from the initial position depending on the position of the faucet handle 14. The sensor PCBA 30 detects the position using the gyroscope 46, the magnetometer 48, and/or the accelerometer 50 and sends signals to the controller 18 to determine how much water is to be released. The controller 18 then sends a signal to the flow control box 20 to release water of a determined flow rate out of the pull down hose 24 to the spray head 16 through the use of the servo motors 42, 44.

Figure 6:
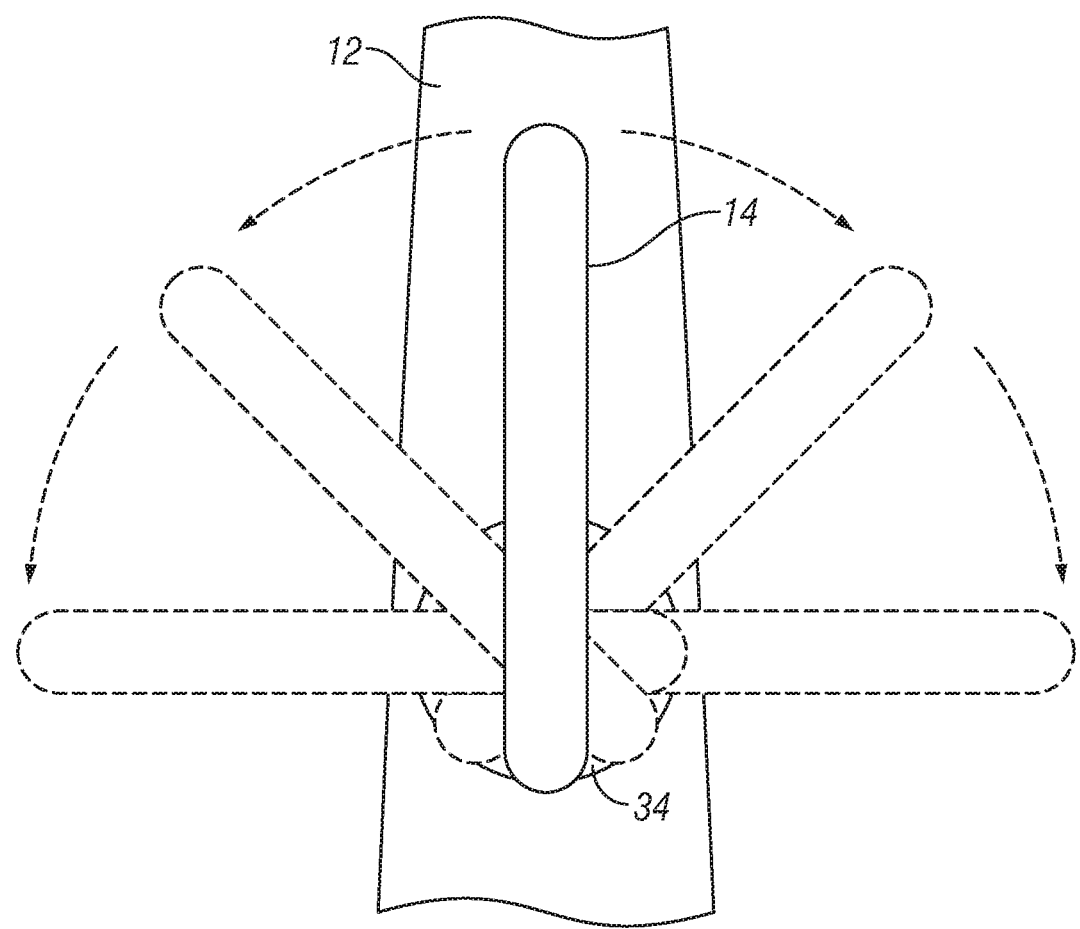
FIG. 6 is a side view of the faucet handle showing the degrees of rotation that the faucet handle can travel along another axis of the faucet handle according to an embodiment of the disclosure.

Referring to FIG. 6, there is shown rotation of the faucet handle 14 from an initial position to one side and from the initial position to the other side. In the example shown, the faucet handle 14 is connected to the movable faucet handle mount 34 that connects to the stationary faucet handle mount 32 (FIG. 3) which is connected to the faucet body 12. The connections allow the faucet handle 14 to rotate as shown. There is one initial position of the faucet handle 14 and four other positions shown in phantom. In another embodiment, there is a plurality of positions that the faucet handle 14 can achieve between the fully extended left position to the fully extended right position.

In one embodiment, as the faucet handle 14 is rotated along the axis of rotation the temperature of water the flow control box 20 releases to the pull down hose 24 connected to the spray head 16 changes. The faucet handle 14 detects its position using the sensor PCBA 30 and sends a signal to the controller 18. The controller 18 determines a temperature of the water to be released from the spray head 16 depending on the spatial orientation of the faucet and sends a signal to the flow control box 20 to output water of a certain temperature and flow rate through the pull down hose 24 to the spray head 16 as discussed above. The flow control box 20 can control the servo motors 42, 44 to release a specific amount of cold and hot water from the water supply inlet hoses 26 to achieve the desired temperature for the water released from the pull down hose 24 to the spray head 16.

In one embodiment, the fully extended left position of the faucet handle 14 could be for the release of the hottest water available. The fully extended right position of the faucet handle 14 can be for the release of the coldest water available. The initial position of the faucet handle 14 can be for the release of an even mix of hot and cold water available. The positions in between the fully extended left position of the faucet handle 14 and the fully extended right position of the faucet handle 14 can be varying mixes of hot and cold water to achieve relatively cold water or relatively hot water. The water can become progressively colder or hotter depending on which direction the faucet handle 14 is rotating towards. In another embodiment, the cold and hot directions may be switched so the fully extended left position of the faucet handle 14 can be for the release of the coldest water available and the fully extended right position of the faucet handle 14 can be for the release of the hottest water available.

Figure 7:
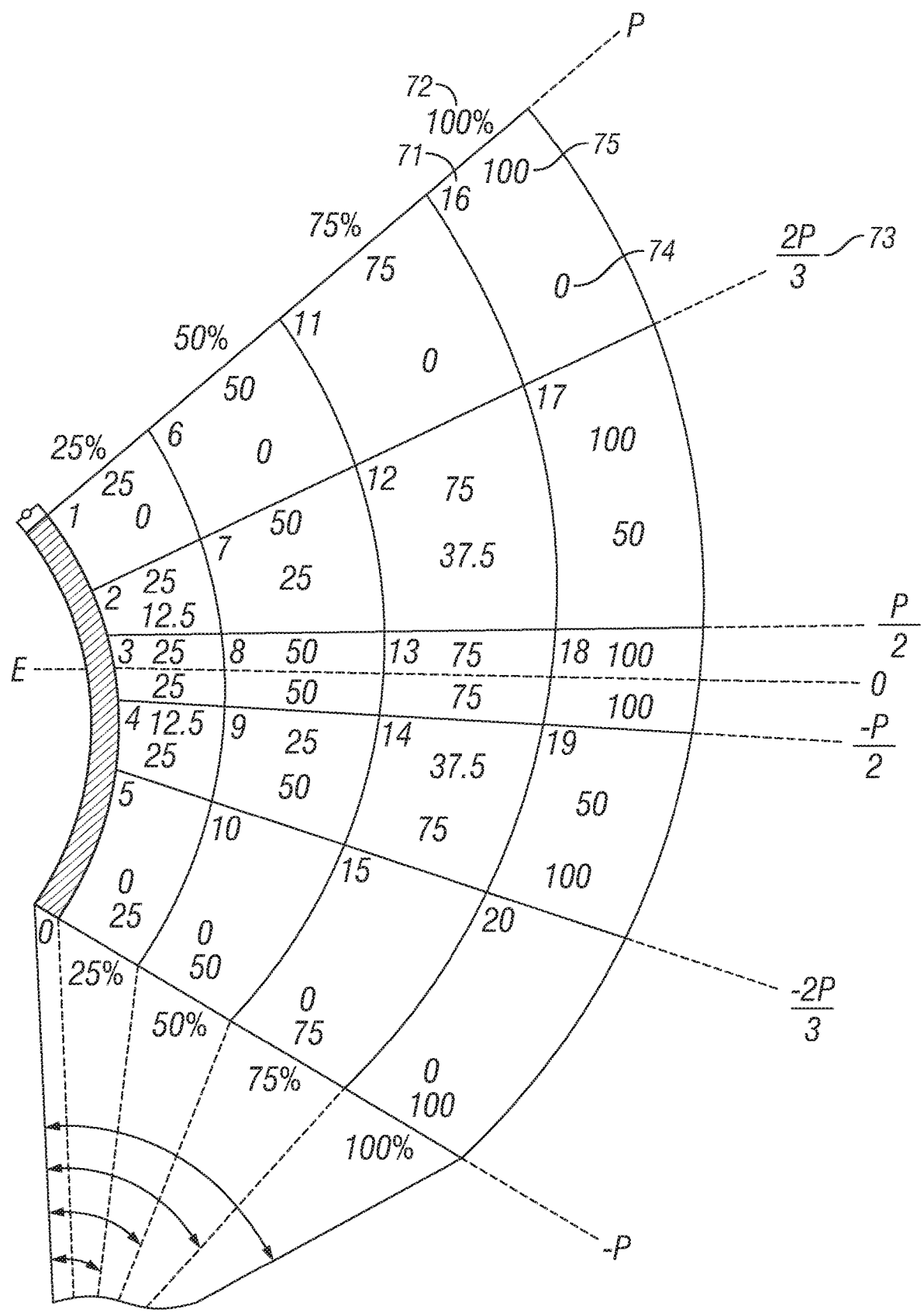
FIG. 7 is a simplified diagram of water values released from two water supply inlet hoses given a position of the faucet handle according to an embodiment of the disclosure.

Referring to FIG. 7, a table is shown that shows an example distribution of water from water supply inlet hoses 26 released through flow control box 20. The table covers the range of motion available for the faucet handle 14. The sections are labeled with section numbers 71 and are located along a spectrum of percentage water flow 72 and a temperature turn value 73. The sections further include a value for the servo motor 1 water inlet 74 and a value for the servo motor 2 water inlet 75. In one embodiment, the value for the servo motor 1 inlet 74 can represent the cold water value and the value for the servo motor 2 inlet 75 can represent the hot water value. In another embodiment, the servo motor values 74, 75 may be switched so that the value for servo motor 1 inlet 74 represents the hot water value and the value for servo motor 2 inlet 75 represents the cold water value. In the shown example, the percentage of water flow 72 ranges from 0 to 100% with four divisions. In one embodiment, the percentage of water flow 72 can be 25%, 50%, 75%, and 100%. In another embodiment, the percentage of water flow 72 may be divided in any way between 0 to 100%.

The temperature turn value 73 can represent the amount of rotation that is achieved for the faucet handle 14. For example, P can represent the fully extended right position of the faucet handle 14 and −P can represent the fully extended left position of the faucet handle 14. In another embodiment, the positions may be switched so P can represent the fully extended left position of the faucet handle 14 and −P can represent the fully extended right position of the faucet handle 14. In the shown example, there are five divisions along the spectrum of temperature turn values 73. In another embodiment, there may be any number of divisions. In another embodiment, P may be divided into quarters and sixths. The temperature turn value 73 can be divided into a plurality of divisions.

The table is divided into several sections as shown in FIG. 7. Each section represents a location the faucet handle 14 can be located during operation. If the faucet handle 14 is located within one of the sections then the faucet 10 would release water according to the values 74, 75 within the section. For example, if the faucet handle 14 has been extended between 75% to 100% of the percentage of water flow 72 and the faucet handle 14 has been turned to a value between 2 P/3 and P for the temperature turn value 73, the faucet 10 would release 100 or the maximum amount of water from servo motor 2 44 and no water for servo motor 1 42.

In another embodiment, the table shown in FIG. 7 can be divided into a plurality of sections such that a continuous change of water flow from water supply inlet hoses 26 through the servo motors 42, 44 can be achieved as the faucet handle 14 changes location along the spectrum of percentage of water flow 72 and temperature turn value 73. In the shown example, the values have a fixed maximum depending on where the faucet handle 14 is located along the spectrum of percentage of water flow 72. The servo motor 42 or 44 side that the faucet handle 14 is located under has the maximum percentage of water flow 72 for the value for servo motor inlet 74 or 75 and the other value for servo motor inlet 74 or 75 is decremented down to zero on the far end depending on how many divisions there are for the temperature turn value 73. In the shown example, there are five divisions and within the first division on each side both of the values for the servo motor inlets 74, 75 are at the maximum depending on where along the spectrum the faucet handle 14 falls on the percentage of water flow 72. Within the next division, the value for the servo motor inlet 74 or 75 for the side the faucet handle 14 is located stays the maximum value and the other value for the servo motor inlet 74 or 75 drops to half of the maximum value. Within the last division, the value for the servo motor inlet 74 or 75 for the side the faucet handle 14 is located stays the maximum value and the other value for the servo motor inlet 74 or 75 drops to zero.

In another embodiment, the values for the servo motor inlets 74, 75 may be decremented in a different way. In another embodiment, the values 74, 75 may be decremented by thirds. The settings for the divisions may be changed depending on user preference. More divisions can result in a more continuous change in water temperature and water flow. The fewer divisions can result in energy conservation since the servo motors 42, 44 will not need to be changed in operation as frequently.

The controller 18 can receive the signals from the sensor PCBA 30 to detect the spatial orientation of the faucet handle 14. The controller 18 can use an algorithm to calculate where in the spectrum of percentage of water flow values 72 and temperature turn values 73 the faucet handle 14 is located from the signals received from the sensor PCBA 30. After crossing a threshold for either percentage of water flow values 72 or temperature turn values 73, the controller 18 can send signals to the flow control box 20 to operate the servo motors 42, 44 to release water of an updated temperature and water flow depending on the spatial orientation of the faucet handle 14.

In another embodiment, the controller 18 can use a look-up table to see what values the controller 18 should set for the values of the servo motor water inlets 74, 75. The controller determines the spatial orientation of the faucet handle 14 and determines which section the faucet handle 14 is located. If the faucet handle 14 located in section number 16 71, then the controller 18 sends a signal to the flow control box 20 to close the water supply inlet hose 26 for servo motor 1 42 and open the water supply inlet hose 26 for servo motor 2 44 to the maximum in order to achieve the value for servo motor inlet 1 74 of 0 and the value for servo motor inlet 2 75 of 100.

Figure 8:
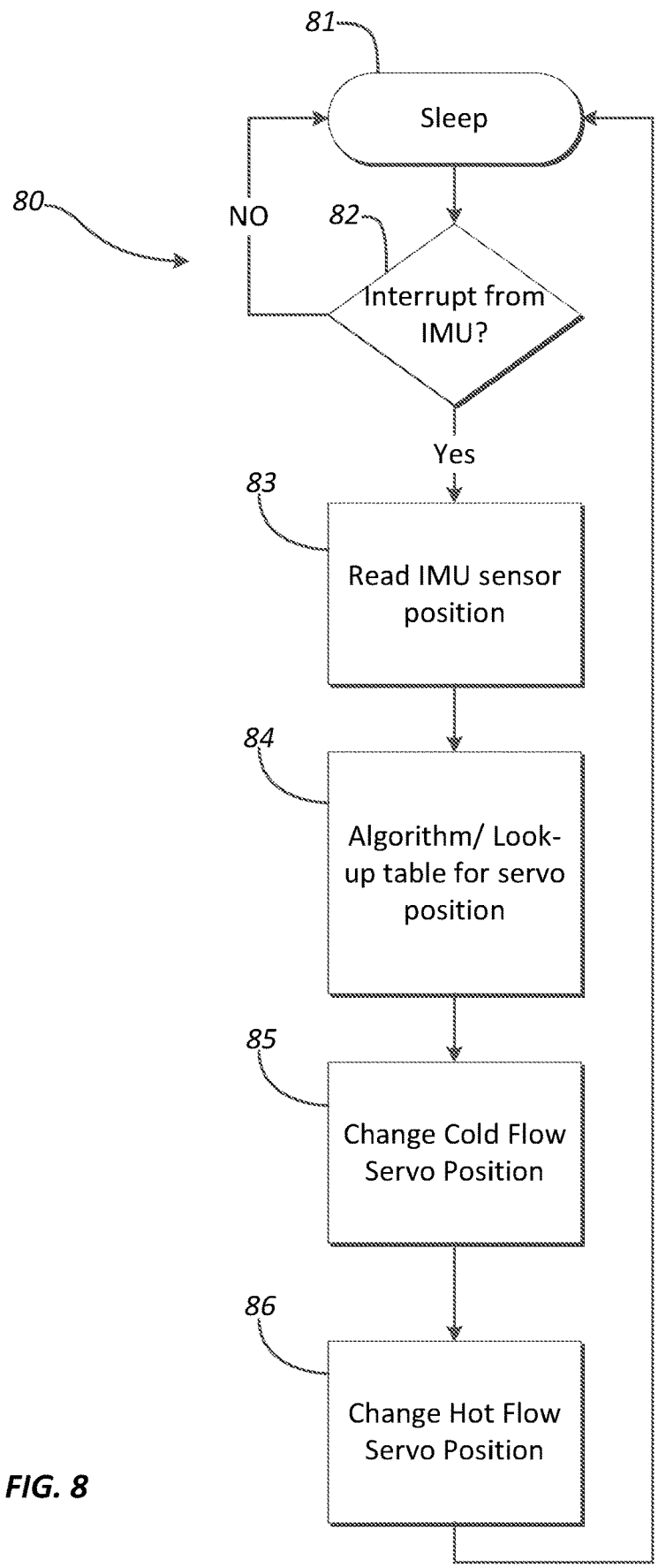
FIG. 8 is a simplified flowchart showing an example operation of the faucet according to an embodiment of the disclosure.

FIG. 8 is a simplified flow chart showing an example operation of the faucet 10. In the shown example, the faucet 10 uses an interrupt method 80 of controlling the operation of the flow control box 20. In the shown example, the interrupt method 80 begins with operation 81 in which the controller 18 is in a sleep state to conserve energy waiting to receive an interrupt from the sensor PCBA 30 or inertial motion unit (IMU) sensor 30. After operation 81, the process continues to operation 82 where there is a check for an interrupt from the IMU sensor 30. If there is an interrupt received from the IMU sensor 30, then the process continues to operation 83. If an interrupt is not received, then the process returns to operation 81 for the controller 18 to sleep.

After the process continues to operation 83, the controller 18 will read the IMU sensor 30 position to determine the spatial orientation of the faucet handle 14. After the controller 18 reads the IMU sensor 30, the process continues to operation 84 where the controller 18 will use an algorithm to calculate the servo motor 42, 44 positions or look-up table for the servo motor 42, 44 positions according to the determined spatial orientation of the faucet handle 14. After the controller 18 determines the servo motor 42, 44 positions, the process continues to operation 85 where the controller 18 sends a signal to the flow control box 20 to change the servo motor 42 or 44 position to change the cold water value being released through pull down hose 24 to spray head 16. After the servo motor 42 or 44 position is changed, the process continues to operation 86 where the controller 18 sends a signal to the flow control box 20 to change the servo motor 42 or 44 position to change the hot water value being released through pull down hose 24 to spray head 16. After both servo motor 42, 44 positions are updated, the process returns to operation 81. In another embodiment, the hot water value may be changed first before the cold water value and so the corresponding servo motor 42 or 44 would change.

In another embodiment, the controller 18 may further wait for another interrupt after receiving an initial interrupt from the IMU sensor 30 to update the positions of the servo motors 42 or 44. The delay can be to wait for the final position the user intends to position the faucet handle 14. The delay may be a set predetermined period of time for the controller 18 to wait to receive additional interrupts. Therefore, the faucet 10 would only need to go through the process once instead of multiple times depending on how many sections the faucet handle 14 crosses.

Figure 9:
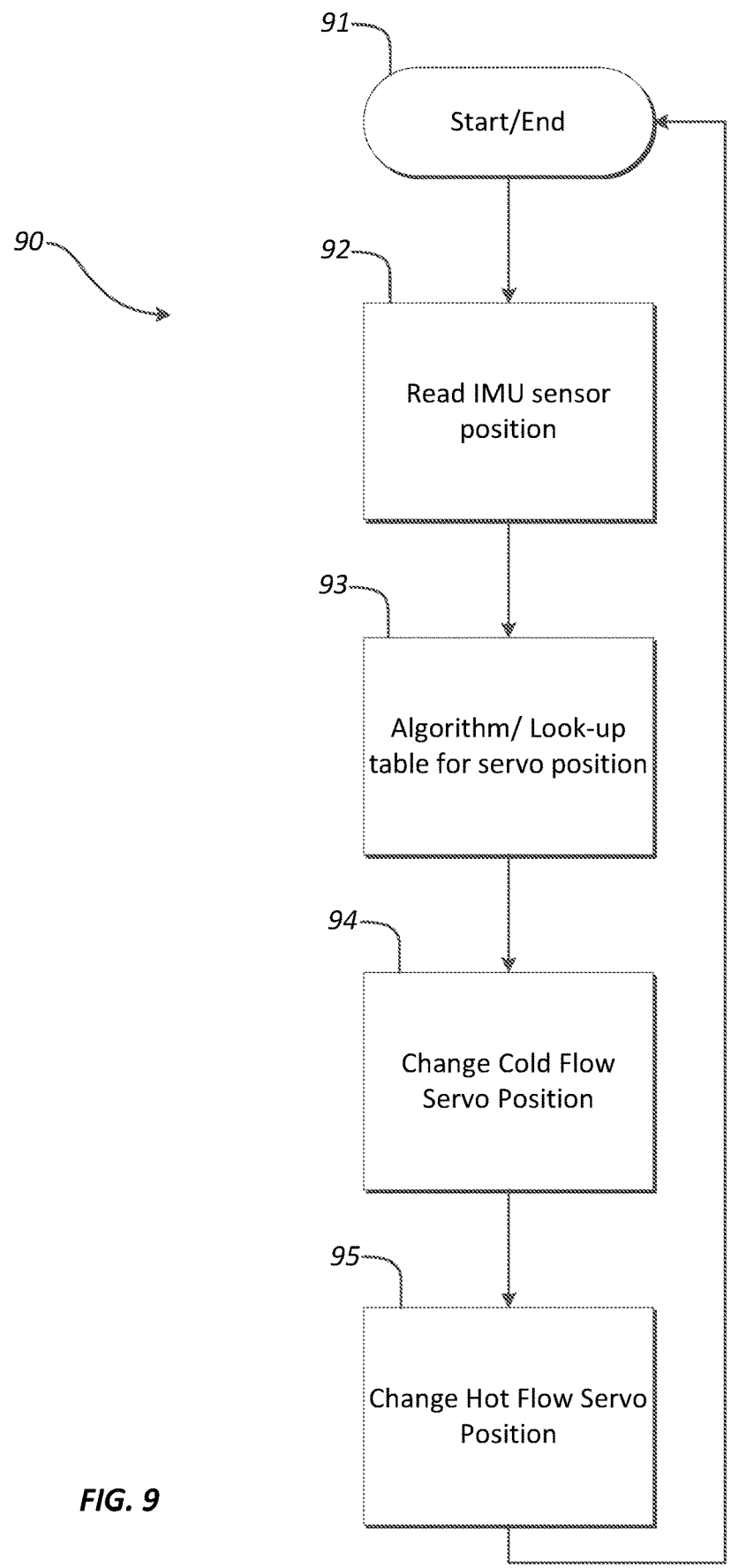
FIG. 9 is a simplified flowchart showing another example operation of the faucet according to an embodiment of the disclosure.

FIG. 9 is a simplified flow chart showing an example operation of the faucet 10. In the shown example, the faucet 10 uses a polling method 90 of controlling the operation of the flow control box 20. In the shown example, the polling method 90 begins with operation 91 in which the controller 18 starts and turns on. After the controller 18 is on, the process continues to operation 92 where the controller 18 reads the IMU sensor 30 position to determine the spatial orientation of the faucet handle 14. After the controller 18 reads the IMU sensor 30, the process continues to operation 93 where the controller 18 will use an algorithm to calculate the servo motor 42, 44 positions or look-up table for the servo motor 42, 44 positions according to the determined spatial orientation of the faucet handle 14. After the controller 18 determines the servo motor 42, 44 positions, the process continues to operation 94 where the controller 18 sends a signal to the flow control box 20 to change the servo motor 42 or 44 position to change the cold water value being released through pull down hose 24 to spray head 16. After the servo motor 42 or 44 position is changed, the process continues to operation 95 where the controller 18 sends a signal to the flow control box 20 to change the servo motor 42 or 44 position to change the hot water value being released through pull down hose 24 to spray head 16. After both servo motor 42, 44 positions are updated, the process returns to operation 91. In another embodiment, the hot water value may be changed first before the cold water value and so the corresponding servo motor 42 or 44 would change.

The polling method 90 can allow for a more continuous change in water flow and temperature than the interrupt method 80 because there is not a wait for an interrupt by the IMU sensor 30. However, the polling method 90 expends more energy by constantly updating the process. In one embodiment, the user can set the method of operation for the faucet 10. For example, there may be a switch (not shown) that can be used to change the method of operation for the faucet 10.

In some embodiments, the controller 18 could be configured to output the reading from the IMU sensor 30 to one or more output devices. For example, the faucet could include a user interface and the controller 18 could update the user interface based on the spatial orientation of the handle detected by the IMU sensor 30. Consider an example faucet with a user interface that includes one or more LEDs. In this example, the controller 18 could adjust the color of the LEDs based on the spatial position reading of the IMU sensor 30 to indicate a temperature of the water (e.g., blue to red for cold to warm). Continuing with this example, the controller 18 could also indicate a flow rate of water by adjusting the intensity of the LEDs, such as less intense for less flow and more intense for more flow. The user interface being one or more LEDs is mentioned solely for purposes of example, but could be any type of output device that provides information to the user, such as audible, haptic, text, symbols, etc. For example, in an accessibility setting, the controller 18 could output an audible sound with a higher frequency for warmer water and a lower frequency for cooler water based on the spatial orientation detected by the IMU sensor, which could be particularly useful for a visually-challenged user. In some embodiments, the user interface could be separate from the faucet, such as using wireless communications with a user's phone, tablet or other electronic devices. For example, the faucet could wirelessly output the relative or actual temperature and/or flow rate to a user's phone using Bluetooth™, WiFi or other wireless protocol.

In some embodiments, the controller 18 could wirelessly communicate the reading from the IMU sensor 30 (i.e., the flow rate and/or temperature) to other electronic devices, such as home automation systems surrounding the faucet. Consider an example in which the controller 18 could wirelessly communicate the readings from the IMU sensor 30 with a water management system. With faucets throughout a building that include a handle with an IMU sensor 30, a total water usage could be calculated by the water management system based on flow rates corresponding from the positional reading from the IMU sensor 30 and adding together the flow rates of faucets throughout the building.

EXAMPLES

Illustrative examples of the faucet disclosed herein are provided below. An embodiment of the faucet may include any one or more, and any combination of, the examples described below.

Example 1 is a faucet including a faucet body and a faucet handle. An inertial motion unit sensor is mounted inside the faucet handle to sense spatial orientation of the faucet handle. The faucet includes an electronic flow control system to adjust flow volume and temperature of water being dispensed. The faucet includes a controller configured to receive signals from the inertial motion unit sensor and control the electronic flow control system to adjust flow volume and temperature of water being dispensed based upon the position of the faucet handle.

In Example 2, the subject matter of Example 1 is further configured such that the inertial motion unit sensor includes at least one of a gyroscope, a magnetometer, or an accelerometer.

In Example 3, the subject matter of Example 1 is further configured such that a range of movement along a first axis of the faucet handle adjusts the flow volume of water being dispensed.

In Example 4, the subject matter of Example 3 is further configured such that a range of movement along a second axis of the faucet handle adjusts the temperature of the water being dispensed, where the first axis and the second axis are not coplanar.

In Example 5, the subject matter of Example 1 is further configured such that the electronic flow control system includes an electronic valve configured to control the flow volume of water being dispensed and wherein the controller is configured to control flow through the electronic valve based on a signal from the inertial motion unit.

In Example 6, the subject matter of Example 1 is further configured such that the controller is programmed with an algorithm configured to interpret a sensor output of the inertial motion unit to adjust the flow volume and temperature of water being dispensed.

In Example 7, the subject matter of Example 1 is further configured such that the controller is configured to use a look-up table to interpret a sensor output of the inertial motion unit to adjust the flow volume and temperature of water being dispensed.

In Example 8, the subject matter of Example 1 is further configured with a flow control box is configured to be connected to at least two of a plurality of water supply inlet hoses and at least one outlet hose in fluid communication with the faucet body. The flow control box includes the electric flow control system.

In Example 9, the subject matter of Example 1 is further configured such that the controller is configured to substantially continuously check for an interrupt from the inertial motion unit to read the inertial motion unit sensor in order for controlling the electronic flow control system to adjust the flow volume and temperature of water.

In Example 10, the subject matter of Example 1 is further configured such that the controller is configured to substantially continuously read the inertial motion unit in order for controlling the electronic flow control system to adjust the flow volume and temperature of water.

In Example 11, the subject matter of Example 1 is further configured with a user-selectable portion in electrical communication with the controller from which reading the inertial motion unit can be selected between: (1) substantially continuously checking for an interrupt from the inertial motion unit to read the inertial motion unit sensor; and (2) substantially continuously reading the inertial motion unit.

In Example 12, the subject matter of Example 1 is further configured with a user-selectable portion in electrical communication with the controller from which interpretation of sensor output of the inertial motion unit can be adjusted: (1) by adjusting an algorithm configured to interpret a sensor output of the inertial motion unit to adjust the flow volume and temperature of water being dispensed; and/or (2) adjusting at least a portion of a look-up table to interpret a sensor output of the inertial motion unit to adjust the flow volume and temperature of water being dispensed.

Example 13 provides a method of controlling a flow volume and a temperature of water dispensed from a faucet. The method includes providing a faucet including a faucet body and a faucet handle. An inertial motion unit sensor measures a spatial orientation of the faucet handle. A controller receives a measurement of the spatial orientation of the faucet handle from the inertial motion unit sensor. The controller provides a signal to an electric flow control system to adjust the flow volume and temperature of water being dispensed. The electric flow control system adjusts the flow volume and temperature of water dispensed based upon the measurement of the spatial orientation of the faucet handle.

In Example 14, the subject matter of Example 13 is further configured such that the inertial motion unit sensor includes at least one of a gyroscope, a magnetometer, or an accelerometer.

In Example 15, the subject matter of Example 13 is further configured by adjusting the flow volume of water dispensed based upon a range of motion along one axis of the faucet handle.

In Example 16, the subject matter of Example 13 is further configured by adjusting the temperature of water dispensed based upon a range of motion along one axis of the faucet handle In Example 17, the subject matter of Example 13 is further configured such that the electronic flow control system includes at least two of a plurality of servo motors to control the flow volume of water being dispensed.

In Example 18, the subject matter of Example 13 is further configured by interpreting the measurement of the spatial orientation of the faucet handle with the controller by using an algorithm to adjust the flow volume and temperature of water being dispensed.

In Example 19, the subject matter of Example 13 is further configured by interpreting the measurement of the spatial orientation of the faucet handle with the controller by using a look-up table to adjust the flow volume and temperature of water being dispensed.

In Example 20, the subject matter of Example 13 is further configured by connecting at least two of a plurality of water supply inlet hoses and at least one of an outlet hose in fluid communication with the faucet body. The flow control box includes the electric flow control system.

In Example 21, the subject matter of Example 13 is further configured by checking continuously for an interrupt from the inertial motion unit with the controller to read the inertial motion unit sensor in order to control the electronic flow control system to adjust the flow volume and temperature of water.

In Example 22, the subject matter of Example 13 is further configured by reading continuously the inertial motion unit with the controller in order to control the electronic flow control system to adjust the flow volume and temperature of water.

In Example 23, the subject matter of Example 13 is further configured such that the controller wirelessly receives the measurement of the spatial orientation of the faucet handle from the inertial motion unit sensor.

In Example 24, the subject matter of Example 13 is further configured such that the controller wirelessly provides the signal to the electric flow control system to adjust the flow volume and/or temperature of water being dispensed.

In Example 25, the subject matter of Example 13 is further configured such that the controller updates a user interface to indicate temperature and/or flow rate being dispensed based on a reading from the inertial motion unit.

What is claimed is:

1. A faucet comprising:
   a faucet body;
   a faucet handle movable with respect to the faucet body;
   an inertial motion unit sensor mounted entirely in the faucet handle to sense spatial orientation along two axes of rotation of the faucet handle;
   an electronic flow control system to adjust flow volume and temperature of water being dispensed; and
   a controller configured to receive signals from the inertial motion unit sensor and control the electronic flow control system to adjust flow volume and temperature of water being dispensed based upon the position of the faucet handle, wherein the controller is configured to adjust the flow volume and/or temperature of water based on data received from the inertial motion unit sensor.

2. The faucet of claim 1, wherein the inertial motion unit sensor includes at least one of a gyroscope, a magnetometer, or an accelerometer.

3. The faucet of claim 1, wherein a range of movement along a first axis of the faucet handle adjusts the flow volume of water being dispensed, wherein a range of movement along a second axis of the faucet handle adjusts the temperature of the water being dispensed, wherein the first axis and the second axis are not coplanar.

4. The faucet of claim 1, wherein the electronic flow control system includes an electronic valve configured to control the flow volume of water being dispensed, and wherein the controller is configured to control flow through the electronic valve based on a signal from the inertial motion unit sensor.

5. The faucet of claim 1, wherein the controller is programmed with an algorithm configured to interpret a sensor output of the inertial motion unit sensor to adjust the flow volume and temperature of water being dispensed.

6. The faucet of claim 1, wherein the controller is configured to use a look-up table to interpret a sensor output of the inertial motion unit sensor to adjust the flow volume and temperature of water being dispensed.

7. The faucet of claim 1, wherein the controller is configured to continuously check for an interrupt from the inertial motion unit sensor to read the inertial motion unit sensor.

8. The faucet of claim 1, wherein the controller is configured to continuously read the inertial motion unit sensor for controlling the electronic flow control system to adjust the flow volume and/or temperature of water.

9. The faucet of claim 1, further comprising a user-selectable portion in electrical communication with the controller from which reading the inertial motion unit sensor can he selected between: (1) continuously checking for an interrupt from the inertial motion unit sensor to read the inertial motion unit sensor; and (2) continuously reading the inertial motion unit sensor.

10. The faucet of claim 1, further comprising a user-selectable portion in electrical communication with the controller from which interpretation of sensor output of the inertial motion unit sensor can be adjusted: (1) by adjusting an algorithm configured to interpret a sensor output of the inertial motion unit sensor to adjust the flow volume and temperature of water being dispensed; and/or (2) adjusting at least a portion of a look-up table to interpret a sensor output of the inertial motion unit sensor to adjust the flow volume and temperature of water being dispensed.

11. The faucet of claim 1, wherein the faucet handle is mounted to the faucet body.

12. A method of controlling a flow volume and temperature of water dispensed from a faucet, the method comprising:
providing the faucet including a faucet body and a faucet handle mounted to the faucet body so as to be movable with respect to the faucet body;
measuring, with an inertial motion unit sensor, a spatial orientation along two axes of rotation of the faucet handle;
receiving, with a controller, a measurement of the spatial orientation of the faucet handle from the inertial motion unit sensor;
providing, with the controller, a signal to an electronic flow control system to adjust the flow volume and temperature of water being dispensed; and
adjusting, with the electronic flow control system, the flow volume and/or temperature of water being dispensed based upon the measurement of the spatial orientation of the faucet handle received from the inertial motion unit sensor.

13. The method of claim 12, wherein the inertial motion unit sensor includes at least one of a gyroscope, a magnetometer, or an accelerometer.

14. The method of claim 12, further comprising adjusting the flow volume of water dispensed based upon a range of motion along a first axis of the faucet handle and adjusting the temperature of water dispensed based upon a range of motion along the first axis of the faucet handle.

15. The method of claim 12, wherein the electronic flow control system includes at least two of a plurality of servo motors to control the flow volume of water being dispensed.

16. The method of claim 12, further comprising interpreting, with the controller, the measurement of the spatial orientation of the faucet handle with an algorithm to adjust the flow volume and temperature of water being dispensed.

17. The method of claim 12, further comprising interpreting, with the controller, the measurement of the spatial orientation of the faucet handle with a look-up table to adjust the flow volume and temperature of water being dispensed.

18. The method of claim 12, further comprising continuously checking for an interrupt from the inertial motion unit sensor with the controller to read the inertial motion unit sensor.

19. The method of claim 12, further comprising continuously reading the inertial motion unit sensor with the controller in order to control the electronic flow control system to adjust the flow volume and/or temperature of water.

20. The method of claim 12, wherein the controller wirelessly receives the measurement of the spatial orientation of the faucet handle from the inertial motion unit sensor.

21. The method of claim 12, wherein the controller wirelessly provides the signal to the electronic flow control system to adjust the flow volume and/or temperature of water being dispensed.

22. The method of claim 12 wherein the inertial motion unit sensor is positioned entirely within the faucet handle.

* * * * *